(12) United States Patent
Skovgaard Jørgensen et al.

(10) Patent No.: US 11,318,708 B2
(45) Date of Patent: May 3, 2022

(54) PANEL

(71) Applicant: ROCKWOOL International A/S, Hedehusene (DK)

(72) Inventors: Kristian Skovgaard Jørgensen, Roskilde (DK); Kenn Christensen, Havdrup (DK)

(73) Assignee: ROCKWOOL INTERNATIONAL A/S, Hedehusense (DK)

( * ) Notice: Subject to any disclaimer, the term of this patent is extended or adjusted under 35 U.S.C. 154(b) by 0 days.

(21) Appl. No.: 16/314,978

(22) PCT Filed: Jul. 4, 2017

(86) PCT No.: PCT/EP2017/066694
§ 371 (c)(1),
(2) Date: Jan. 3, 2019

(87) PCT Pub. No.: WO2018/007413
PCT Pub. Date: Jan. 11, 2018

(65) Prior Publication Data
US 2019/0308389 A1 Oct. 10, 2019

(30) Foreign Application Priority Data
Jul. 4, 2016 (EP) .................................... 16177813

(51) Int. Cl.
*B32B 5/24* (2006.01)
*B32B 5/02* (2006.01)
(Continued)

(52) U.S. Cl.
CPC ............... *B32B 5/245* (2013.01); *B32B 3/02* (2013.01); *B32B 5/022* (2013.01); *B32B 5/18* (2013.01); *B32B 5/20* (2013.01); *B32B 13/00* (2013.01); *B32B 13/02* (2013.01); *B32B 13/045* (2013.01); *B32B 2260/021* (2013.01); *B32B 2260/044* (2013.01); *B32B 2262/067* (2013.01); *B32B 2262/10* (2013.01); *B32B 2262/101* (2013.01); *B32B 2262/108* (2013.01); *B32B 2266/0271* (2013.01); *B32B 2266/0278* (2013.01); *B32B 2266/04* (2013.01); *B32B 2266/057* (2016.11);
(Continued)

(58) Field of Classification Search
CPC ..................................................... B32B 5/245
USPC ......................................................... 428/157
See application file for complete search history.

(56) References Cited

U.S. PATENT DOCUMENTS

2018/0251976 A1* 9/2018 Mosiadz ................... E04C 2/16

FOREIGN PATENT DOCUMENTS

EA 012763 B1 12/2009
EP 2034102 A1 * 3/2009 ............. E04C 2/288
(Continued)

OTHER PUBLICATIONS

Translation of FR-2647140-A1 (Year: 1990).*
(Continued)

*Primary Examiner* — Brent T O'Hern
(74) *Attorney, Agent, or Firm* — Tarolli, Sundheim, Covell & Tummino LLP

(57) ABSTRACT

A panel and a method of making a panel are provided. The panel comprises a cured polymeric foam layer that is formed by application of a foam composition to an edge surface of the panel and then shaped and cured. The panel comprises man-made vitreous fibre or wood wool cement.

14 Claims, 3 Drawing Sheets

(51) Int. Cl.
*B32B 5/18* (2006.01)
*B32B 13/02* (2006.01)
*B32B 13/04* (2006.01)
*B32B 3/02* (2006.01)
*B32B 13/00* (2006.01)
*B32B 5/20* (2006.01)

(52) U.S. Cl.
CPC ..... *B32B 2307/102* (2013.01); *B32B 2307/72* (2013.01); *B32B 2307/732* (2013.01); *B32B 2419/00* (2013.01); *B32B 2419/04* (2013.01); *B32B 2607/00* (2013.01)

(56) References Cited

FOREIGN PATENT DOCUMENTS

| | | | | |
|---|---|---|---|---|
| FR | 2647140 A1 | * | 11/1990 | .......... E04F 13/0862 |
| GB | 1394621 A | | 5/1975 | |
| GB | 2344834 A | | 6/2000 | |
| JP | H04364908 A | | 12/1992 | |
| WO | 2014102713 A1 | | 7/2014 | |
| WO | 2014111552 A1 | | 7/2014 | |
| WO | WO-2014102713 A1 | * | 7/2014 | ............. E04C 2/243 |

OTHER PUBLICATIONS

International Search Report and Written Opinion dated Sep. 26, 2017 for corresponding International Application No. PCT/EP2017/066694.

* cited by examiner

PANEL

RELATED APPLICATIONS

The present application is a U.S. National Stage application under 35 USC 371 of PCT Application Serial No. PCT/EP2017/066694, filed on 4 Jul. 2017; which claims priority from EP Patent Application No. 16177813.9, filed 4 Jul. 2016, the entirety of both of which are incorporated herein by reference.

FIELD OF THE INVENTION

The invention relates to improved panels and methods of manufacturing improved panels, in particular to improving the edges of panels.

BACKGROUND

Man-made vitreous fibre (MMVF) panels that are used, for example, in the production of suspended ceilings are typically of a relatively low density, approximately 65-165 kg/m$^3$. It is desirable to use such a low density in order to obtain the desired acoustic properties and decrease the mass. Conventionally, panels are of standard form, having two opposed generally parallel major faces between which extend minor faces, generally known as the edge surfaces. Panels of this type have a tendency to exhibit edge surface defects. These defects are more pronounced at the edge surfaces than at either major face of a MMVF panel, since a MMVF panel may typically be made by cutting a larger web of MMVF to shape. Additionally, the edge surfaces may exhibit undesirably low density at the surface, and protrusion of fibres from the surface, resulting in a "fluffy" appearance. Therefore the edge surfaces of a MMVF panel are often the cut surfaces and, unlike the major faces, the fibres do not lie predominantly parallel to the edge surfaces. Furthermore, the major faces are usually substantially planar, whereas the edge surfaces are commonly profiled in some way, for instance so as to allow concealed suspension of panels.

A similar problem exists for wood wool cement boards. Wood strands typically lie in the plane of the panel and thus the panel edge comprises many cut ends of wood strands. Edge surface defects result from this structure in a similar manner as in MMVF panels, although the density may be different.

Defects at the edge surfaces can take various forms, including indentations, protrusions and exposed fibre ends or strand ends. This may make edge surfaces of a panel fragile compared to the faces. Panels are typically painted before installation and the imperfections of the fragile edge surfaces are still noticeable after painting.

Additionally, visible defects in the edge surfaces are especially undesirable for panels where portions of the edges might be on display in use, for example in a ceiling panel.

WO2014/102713A1 discloses a sandwich panel comprising a polymeric foam core and bonded MMVF outer panels. The end use embodied is structural insulation for window frames. WO2014/102713A1 aims to achieve a rigid insulating board with good insulating properties, good fire resistance, low density and good bending strength and compressive strength, so that the panels can be used in circumstances where support of another element, such as a door or window frame, is required.

JP H04-364908 A discloses a method for producing low density phenol resin foams.

WO2014/111552A1 discloses a sandwich panel for use in a raised floor system. The sandwich panel comprises a foam composite core disposed between a bonded MMVF base layer and a floor surface tile.

GB1394621 describes a method to strengthen the edges of a fibrous sheet material. This method entails applying a resin to the edges of the fibrous sheet material and curing the resin such that a hardened edge is obtained. The resin is applied as an emulsion by a roller and must be heated to remove dispersion medium and to cure the resin. Unfortunately, the thermosetting acrylic polymer resins preferred for the method of GB1394621 add only some strength to the edges and do not properly compensate for the defects that are found in mineral fibre acoustic panels and wood wool cement panels. Additionally, the hardened resin does not facilitate easy precision shaping of the acoustic panel that it aims to strengthen, because it is hard—increasing the amount of energy required to machine the resin—and because it is also relatively brittle.

GB2344834 describes a mineral wool thermal insulation sandwich panel especially designed for use in very low temperature applications, such as freezers. This panel includes edge strips of pre-formed high density phenolic foam that are bonded to the edge surfaces of the panel in order to help render it vapour-impermeable. This helps to avoid ice forming inside the bulk mineral wool in a freezer application. Additionally, the insulation panel requires an impermeable cover for the faces. Either of steel-reinforced polyester or glass-reinforced polyester are envisaged for this component. The edge strips do not, however, compensate for the defects found on the edge surfaces of mineral wool panels or wood wool cement panels. Indeed, it is taught to be desirable that the face cover may be extended to wrap around the corners so as to reinforce the edges.

Thus, it would be desirable to produce a panel in which these edge defects are remedied.

SUMMARY OF THE INVENTION

A first aspect of the invention provides a method of producing a modified panel, comprising:
  providing a panel, which has a first major face that is opposed to a second major face and at least one minor face extending between the major faces;
  providing a foam composition;
  applying the foam composition to a minor face of the panel; and curing the applied foam composition, thereby forming a layer of cured polymeric foam.

The panel to be modified generally has the form of a conventional panel, so that the at least one minor face is generally substantially perpendicular to the major faces, which are generally parallel. The panel will have a thickness that is defined by the width of the one or more minor faces, which can also be described as the edge surfaces.

A second aspect of the invention provides a modified panel comprising a panel, which has a first major face opposed to a second major face and at least one minor face extending between the major faces;
wherein the panel comprises a layer of polymeric foam on a minor face,
wherein the exposed polymeric foam surface comprises a milled surface.

A third aspect of the invention provides a modified panel comprising a panel which has a first major face opposed to a second major face and at least one minor face extending between the major faces;

wherein the panel comprises a layer of polymeric foam on a minor face,
wherein the polymeric foam comprises polyurethane, silicone or an epoxy system, preferably polyurethane.

The method and product of the invention have several advantages. It is desirable to make panels that have well-defined and more complex edge surface profiles. The foam composition that is applied to one or more of the minor faces of the panel make this possible, since the foam composition conforms easily to even complex edge profiles and the resulting polymeric foam is easily shaped using conventional methods such as milling. Conventional panels can have planar, flat minor faces that are required to be well-defined, however the invention also enables more complicated shapes to be uniformly machined without visible defects.

Additionally, the polymeric foam acts as reinforcement to improve the strength of the edges of the panel, which are weak by nature and may show defects, which in some cases weaken the edges further.

Furthermore, and maybe more importantly, the polymeric foam layer has the capacity to compensate for defects in the surface, to camouflage defects and to close the surface of the edges of the panel.

The invention is particularly beneficial when the panel is a man-made vitreous fibre (MMVF) panel. Due to the manufacturing process of such panels, some areas may be non-homogenous, for example where an excess or deficit of binder is present. The polymeric foam of the invention is especially well suited to compensate for the edge defects at the minor face of a MMVF panel.

Reinforcing the edges of a panel in this way may improve its longevity and also makes it easier to paint prior to installation. This is especially beneficial when the panel is a ceiling panel, because the edges are visible to consumers during transport and installation, and may be visible in the installed state. A uniform, defect-free painted minor face surface is desirable for a ceiling panel.

A further advantage of the invention is that an array of the improved panels may be provided, for example as a suspended ceiling, without the appearance of gaps between the panels, inter alia because tolerances may be reduced due to the foam layer.

DETAILED DESCRIPTION

Panel

Figure 1:
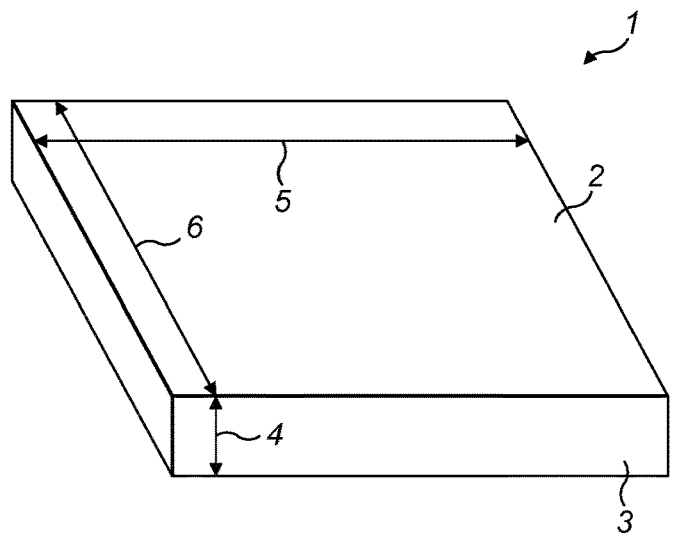
FIG. 1 shows a conventional panel suitable for modification according to the invention.

The panel used in the invention may comprise first and second major faces which are generally substantially parallel, and one or more minor faces extending between, and typically substantially perpendicular to, the major faces. Usually the major faces are substantially planar and are substantially rectangular (often square), although other shapes are of course possible. Thus the panel which is modified according to the method of the invention is a conventional panel. It can be any conventional type of panel, but preferably it is a ceiling panel, and the modified panel is suitable for use as a ceiling panel.

The panel may be a man-made vitreous fibre (MMVF) panel or a wood wool cement panel.

Preferably the panel is a MMVF panel comprising bonded MMVF. An MMVF panel is able to absorb the foam composition, such that the end product comprises a composite layer of foam and MMVF at the surface of a minor face. Additionally, a finer edge profile for the surface of the minor face, for example grooves or recesses, may be possible when using a MMVF panel due to the finer fibres.

At densities typical for MMVF or wood wool cement panels, there may be visible defects present at the minor faces of the panel. Such defects may be in the form of indentations and protrusions, areas with reduced binder content or areas of lower density. Defects may decrease the strength of the panel and also may result in non-uniform panel edge shape. Ideally in use as, for example, a suspended ceiling, the panels have uniform shape and uniform straight edges. The polymeric foam layer applied according to the present invention compensates for the defects in terms of both strength and shape, and it may also provide new mechanical properties to the edges, such as flexibility.

The panel may have a length in the range of 600 to 1200 mm, which is standard length in Europe, but other lengths could be relevant. For instance for some applications, such as wall panels, the length can be up to 2700 mm. The length of the panel normally corresponds with the length of the major faces.

The panel may have a width in the range 300 to 1200 mm. The width of the panel normally corresponds with the width of the major faces.

The panel may have a thickness in the range 10-100 mm, preferably 10-40 mm. The thickness of the panel corresponds with the width of the minor face or faces. The thickness of a MMVF panel is suitably 10-40 mm. The thickness of a wood wool cement panel is suitably 10-50 mm, such as 25 or 35 or 50 mm, preferably 25 or 30 mm.

The one or more minor faces of a panel suitable for use as a ceiling panel may have a 3D profile. For concealed edges there will be recesses and grooves to accommodate the suspension means, such as common grid systems based on inverted T-profiles.

Preferably at least one, preferably both, of the major faces of the panel, are exposed MMVF or wood wool cement, and are not provided with an impermeable facing. They can be provided with a permeable fibrous facing. Preferably the first major face is provided with an MMVF facing, most preferably a glass fibre facing. This is conventional for ceiling panels.

MMVF Panels

MMVF panels suitable for use in the invention may have a density of 65-165 kg/m$^3$. This density of MMVF is particularly suitable for acoustic suspended ceiling panels. Generally a higher density of around 150 kg/m$^3$ is used for select panels with high demands for the visual quality, and often also special edges for concealed suspension. In case of more simple edges a density in the range of 800-120 kg/m$^3$ is often adequate. A lower density means lower production cost, but with sacrifice of strength and edge quality.

The MMVF panel may comprise a bonded, nonwoven web of MMVF. The MMVF can for example be stone fibres, glass fibres, slag fibres and ceramic fibres.

Preferably, the MMVF are stone fibres.

Stone fibres may have the following composition, all amounts quoted as wt % as oxides and all iron oxides being quoted as $Fe_2O_3$:

$SiO_2$ 25 to 50, preferably 38 to 48
$Al_2O_3$ 12 to 30, preferably 15 to 28
$TiO_2$ up to 2
$Fe_2O_3$ 2 to 12
CaO 5 to 30, preferably 5 to 18
MgO up to 15, preferably 4 to 10
$Na_2O$ up to 15
$K_2O$ up to 15
$P_2O_5$ up to 3
MnO up to 3
$B_2O_3$ up to 3

An alternative stone fibre composition may be as follows, all amounts quoted as wt % of oxides, and all iron oxides being quoted as $Fe_2O_3$:

$SiO_2$ 37 to 42
$Al_2O_3$ 18 to 23
CaO+MgO 34 to 39
$Fe_2O_3$ up to 1
$Na_2O+K_2O$ up to 3

The MMVF nonwoven web of the MMVF panel may be bonded using any suitable binder. Suitable binders include phenolic, epoxy, acrylic, water glass, polypropylene, polyethylene, and bicomponent binders.

Wood Wool Cement Panels

Wood wool cement panels are also suitable for use as the panel in the invention. A wood wool cement panel may comprise strands of wood—the "wood wool" component is sometimes referred to as "excelsior"—that are bonded with cement. Wood strands may have a diameter of from 0.5 to 3 mm. The wood strands may lie substantially in the plane of the major faces of the panel, such that many cut ends of wood strands are present at the minor faces of the panel.

The wood wool cement panel may consist entirely of wood wool and cement. Alternatively, the wood wool cement panel may be a "sandwich panel", comprising two wood wool cement boards separated by a core material such as expanded polystyrene, MMVF, or other insulating materials.

Foam Composition

In this specification, "foam composition" refers to all stages of the foam component that is applied to a minor face, starting from the separate foam precursors and other ingredients and ending with the expanded reaction product of the foam precursors and other ingredients, applied to a minor face and at the gel point (i.e. when the foam is "tack-free" but not fully cured). Initially, the foam composition generally comprises a mixture of foam precursors, optionally including one or more of the following: additives, solvent, catalyst, fillers, pigments, flame inhibitors and blowing agent. The end product is a cured polymeric foam. Between the gel point and the end product the foam is partially cured.

A "cured polymeric foam" refers to a foam composition in which the foam precursors have fully reacted and the resulting polymer has undergone cross-linking. When the foam is cured, no further cross-linking occurs.

Polymeric foams may be based on one component only, where reaction is initiated by e.g. humidity contained in the air. However it is generally a better option to use a chemically-curing polymeric foam. Such polymeric foams are based on two or more components, as it is easier to control the process and tailor the foam to the specific application. Polymeric foams are typically formed by the simultaneous occurrence of polymerisation of foam precursors and generation of gas. Foam precursors are two or more components that polymerise to form the polymeric foam. A foam precursor may itself be a polymer. The foam precursors are chosen according to the final polymeric foam that is desired. For example, a polyol and an isocyanate are suitable precursors for making a polyurethane foam.

Prior to, or simultaneously with, application, the polymeric foam precursor or precursors must be combined with the other components of the polymeric foam. The resulting mixture may be called a "foam composition". In some foam compositions polymerisation may begin substantially immediately on mixing.

A silicone foam system may be used for softer and more elastic edge finishes. In addition, a silicone foam layer may adhere well to mineral wool panel edges, clearly wetting the surface and thus creating a layer at the surface Furthermore, a silicone foam may be beneficial for minimising the thickness of the foam layer, namely in cases where it is desired to provide a particularly thin foam layer.

An epoxy foam system may be beneficial where a very hard surface is required for the edge of the panel. An epoxy foam layer may have a lower porosity than a polyurethane foam layer. Additionally, an epoxy foam layer may provide a high strength edging to the panel. Furthermore, an epoxy foam system may provide superior bonding to the panel, as it may be able to almost completely penetrate mineral wool panels and sink in to the mineral wool.

Preferred foam compositions are those which are capable of producing polyurethane foams. Polyurethane foams can have advantages, in particular over the silicone and epoxy foam types mentioned above. For instance, polyurethane foams can be easier to cover with a layer of paint (for instance relative to silicone foams). Polyurethane foams are generally easy to mill (for instance relative to epoxy foams).

Polyurethane foams are produced by the reaction of a polyol with an isocyanate, often in the presence of a blowing agent. Therefore, the polymeric foam precursors for a polyurethane foam comprise a polyol and an isocyanate.

The isocyanate can, for example, be selected from methylene polymethylene polyphenol isocyanates (PMDI), methylene diphenyl diisocyanate (MDI), toluene diisocyanate (TDI), hexamethylene diisocyanate (HDI) and isophorone diisocyanate (IPDI).

A blowing agent may be required in order to expand the foam composition. The blowing agent may be a chemical blowing agent or a physical blowing agent. The blowing agent may be a part of the foam composition.

Suitable blowing agents include water, $CO_2$ and nitrogen, and cyclohexane.

In the context of a polyurethane polymeric foam, the blowing agent may be water. Water acts as a chemical blowing agent, reacting with the isocyanate to form $CO_2$, which acts as the blowing gas.

Alternatively, the polymeric foam may be a polyisocyanurate foam, an expanded polystyrene foam or an extruded polystyrene foam.

Alternatively, but less preferably, the foam composition may form a phenolic foam. Phenolic foams are formed by a reaction between a phenol and an aldehyde (i.e. the foam precursors), in the presence of an acid or a base. A surfactant and a blowing agent are generally also present to form the polymeric foam.

The foam composition may comprise additives. Suitable additives include fire retardants such as graphite powder, nitrogen-containing polymers and phosphorous-containing polymers; surfactants, that may aid in mixing and stabilizing the foam composition; and pigments.

The foam composition may comprise a solvent.

The foam composition may comprise a catalyst. Suitable catalysts include acids and bases. Alternatively, ultraviolet light may be used to catalyse polymerisation of the polymeric foam precursors. Alternatively, polymerisation may proceed without the need for catalysis.

The foam composition preferably does not comprise a filler.

In addition to or as an alternative to inclusion of a blowing agent, one or both of the polymeric foam precursors may be mechanically agitated such that it is aerated prior to inclusion in the foam composition. In other words, one or both of the polymeric foam precursors may already have a foam-like structure. Use of an aerated polymeric foam precursor may reduce or eliminate the need to carefully balance the polymerisation and gas generation reactions that are otherwise necessary to form a polymeric foam.

The components of the foam composition are preferably mixed prior to application to the minor face of the panel. However, they are generally not mixed a significant time before application, because it is common for foam formation and curing to begin as soon as the components come into contact with one another. Preferably a single apparatus is used for the mixing and application. Preferably the application takes place immediately following mixing. The composition as applied to the minor face may have undergone significant foaming and even some curing but is not fully cured when applied.

Application of the Foam Composition to the Panel

The foam composition may be applied to one or more of the minor faces of the panel using any suitable method, for example by ejection or deposition through a nozzle or by spreading onto the edge surfaces using a knife, or using air assisted deposition or spreading. A nozzle is preferred because it facilitates control of ejection rate and even application of the foam composition.

The foam composition may partially or fully permeate into the MMVF or wood wool cement, such that there is no clear plane where the panel stops and the foam starts when looking at a cross section. Thus, the "layer of cured polymeric foam" may be a layer wholly or partially absorbed within the MMVF panel or wood wool cement panel, at the surface of a minor face.

In the conventional case where the panel is rectangular, having rectangular major faces and four minor faces, the foam composition may be applied to one or more of the minor faces of the MMVF panel. Preferably it is applied to each of the minor faces.

The foam composition may be applied to the whole of a (or each) minor face or part of a (or each) minor face. The polymeric foam layer may extend from the first to the second major face and hence cover the entire surface of the relevant minor face, which may provide improved mechanical properties of the edge, such as improved strength, flexibility etc. With improved mechanical properties it may be possible to reduce the density of the panel, thereby saving cost. However, it is preferred that the polymeric foam layer covers only a portion of the width of the relevant minor face or faces. Preferably the polymeric foam layer covers not more than half of the width of the relevant minor face, preferably not more than one quarter of the width of the minor face. In this case, the polymeric foam layer is applied only to the portion of the minor faces that will be visible once the modified panels are in place. This is relevant for instance in the case of use of the modified panels as ceiling panels. This reduces the amount of polymeric foam required to achieve a uniform surface appearance and minimises the amount of polymer material required.

The foam composition may be applied in excess to allow for removal of some polymeric foam during shaping. This may be especially beneficial if a desired profile is to be formed into the polymeric foam layer. By removing excess foam material a very uniform surface may be provided, which is a major benefit compared to panels known in the art. Shaping a surface of e.g. a MMVF panel is difficult, and generally requires a panel having a surface that is relatively strong and stiff, so that the surface is not too resilient during shaping. This generally sets some minimum requirements on the density of the panel, which increases the cost of the panel. Furthermore, MMVF panels, for example, are generally relatively inhomogeneous and may contain defects, which may make it very difficult to provide a high quality edge. Hence a surface with milled foam is much more uniform than an ordinary MMVF surface.

In the case when the panel is provided on at least one major face with a glass (or other) fibre facing, it can be preferred for the facing to extend beyond the extent of the major face itself, so as to provide an overhang. This is usually short, for instance up to 3 mm. The presence of such an extending facing can be beneficial in that it can prevent unwanted application of the foam composition to part of the major face and consequent contamination. Alternatively an overhang may be provided in other ways, e.g. by machining the edge to provide a groove or an overhang.

The foam composition may be applied through a nozzle which is positioned such that there is an angle ($\alpha$) of from 5° to 30°, preferably 20° to 30°, between the plane of the front major face and the nozzle. Thus the nozzle is angled in a direction from the side relative to the minor face but slightly downwardly so the foam is applied to the minor surface whereas the front face is protected from foam by the overhang. Such an angle is possible when the MMVF panel is provided with an overhanging glass fibre facing on the front major face.

The foam composition may alternatively be applied through a nozzle that is positioned at a larger angle, for instance an angle ($\alpha$) of from 60° to 70°, between the plane of the front major face and the nozzle, i.e. in a direction downwardly and slightly to the side of the minor face. Such an angle is suitable for application of the foam composition in the absence of any overhanging facing on the front face and may help prevent the foam composition from seeping around to, or being inadvertently applied to, the front major face.

In a further advantageous embodiment, the foam composition may be applied through a nozzle which is positioned such that there is an angle ($\alpha$) of below 0° between the plane of the front major face and the nozzle. Thus the nozzle is angled in a direction from the side relative to the minor face but slightly upwardly so the foam is applied to the minor surface whereas the front face is protected from foam by the overhang. Such an angle is advantageous when the MMVF panel is provided with an overhanging facing on the front major face, and ensures maximum coverage of the area of the minor face closest to the overhanging facing. Preferred angles ($\alpha$) are in the range 0° to −30°, preferably −10° to −20°.

The foam composition expands during and/or after it is applied, to form an expanded composition. Expansion (also known as "foaming") occurs due to the reaction between the components of the polymeric foam and/or due to the blowing agent present.

Alternatively, the foam composition may be allowed to expand prior to application to a minor face of an MMVF panel.

In a particularly preferred method a minor face of the panel is milled, but not to the final shape of the minor face profile, before the foam composition is applied. The partial milling may provide a shoulder of MMVF (or wood wool cement).

The foam is applied to this partially-milled minor face in excess of the amount of foam that will be present in the finished product. Then the foam is cured. During application of the foam composition, the major faces of the panel are substantially horizontal and the minor faces of the panel are substantially vertical. The shoulder preferably extends from the lower portion of the minor face to which the foam composition is applied. This is advantageous because the shoulder prevents dripping of the foam composition, which in turn prevents wastage of foam composition and prevents equipment from becoming dirty with waste foam.

The upper major face in this method may be provided with an overhanging fleece facing, such as a glass fibre fleece. The foam composition is then applied between the shoulder and the overhang of fleece facing. This overhang on the upper major face may prevent foam composition from seeping onto the upper major face.

If no fleece facing overhang is provided, the foam composition may be applied at a downward angle to help prevent the foam composition from contaminating the upper major face.

Once the foam composition is cured, the cured foam and the minor face of the panel are milled together in one step, to produce the final shape.

Alternatively, the foam composition may be applied to a minor face that has already been milled to its final shape. Suitably, during application of the foam composition the panel is positioned such that the major faces are substantially horizontal and the minor faces are substantially vertical. This method has the advantage of requiring milling of the panel only once.

Additionally, the lower major face may be provided with an overhanging facing to prevent dripping of the foam composition. The upper major face may be provided with an overhanging facing to prevent the foam composition from seeping onto the upper major face.

A facing may preferably comprise a non-woven glass fibre fabric.

Shaping and Curing the Foam Composition

In the method of the invention it is preferred to distribute or shape the polymeric foam layer after application to the minor face. This allows the generation of a virtually defect-free surface and in some cases a profile can even be shaped into the polymeric foam layer.

Prior to the foam composition reaching its gel point, shaping can for example be by means of a roller, a scraper, soft air pressure or constriction in a mould. The gel point is reached when the foam composition is tack-free. Shaping prior to the gel point allows the use of lower energy methods, with associated environmental benefits.

Alternatively or additionally, the foam may be shaped subsequent to the gel point, i.e. when the foam is partially or fully cured. In this instance, any suitable machining method may be employed, for example milling, cutting, sawing, sanding. Milling is preferred. Shaping subsequent to curing may allow finer control of the shape of the profile of the minor face and thus may result in a more precisely shaped final product. Shaping subsequent to curing may also allow a better-controlled foam density.

The foam composition requires curing before the modified MMVF panel is suitable for use, e.g. as a suspended ceiling panel. Curing may be conducted either before or after shaping. Curing the polymeric foam comprises cross-linking of the components, alternatively evaporating any solvents to leave behind only the solid polymeric foam. In the context here the words "curing" and "cured" are generally considered to refer to the point with cross-linking to a degree where the foam is tack-free, as it is generally possible to machine the foam when it is tack-free. This is often referred to as the "gel point".

The conditions suitable for curing are chosen according to the components of the foam composition. For some foam compositions, curing may be conducted at room temperature. For other foam compositions elevated temperature is required, for instance up to 50° C. Curing to tack-free requires an appropriate length of time (tack-free time), for example from 0.5 to 2 minutes, whereas full curing (meaning that no further curing will take place) generally takes at least 10 min and often more than 30 min, and up to hours or days.

Conventional panels can be shaped, for instance by milling, to create a profiled minor face or edge surface. In the invention this can be done prior to application of the foam composition.

However, it can be convenient, and often preferred, in the invention, that an edge profile feature be shaped into any part of the minor face of the panel that is not covered by polymeric foam, after application of the polymeric foam layer and preferably as part of the same step as the shaping of the polymeric foam layer. This minimises the number of different steps required in the method.

DETAILED DESCRIPTION OF THE DRAWINGS

In the drawings, the following reference numbers are used:
1 panel
2 major face
3 minor face
4 thickness of panel/width of minor face
5 width of panel and major face
6 length of panel and major face
7 polymeric foam layer
8 flat surface of polymeric foam layer
9 shaped surface of polymeric foam layer
10 glass fibre facing
11 overhang
12 first major face
13 second major face
14 nozzle
15 terrace
16a external foam layer
16b internal foam layer
α angle between nozzle and plane of first major face A schematic of a typical MMVF panel (1) is shown in FIG. 1. The MMVF panel comprises two substantially parallel planar major faces (2) and at least one minor face (3) extending between and substantially perpendicular to the major faces (2). The MMVF panel (1) has a thickness (4), a width (5) and a length (6).

Figure 2A:
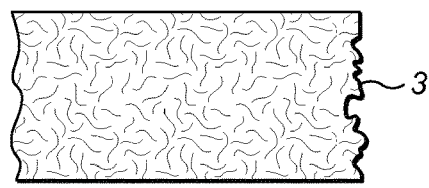
FIGS. 2*a-c* show a cross-sectional view of the surface of a minor face of a panel of the type in FIG. 1.

MMVF panel edges may suffer from edge defects. A schematic of a portion of a minor face (3) of an MMVF panel (1) is shown in FIG. 2a. The cut edge of the minor face (3) contains imperfections, which are undesirable from an aesthetic perspective, and sometimes also from a strength perspective.

Figure 2B:
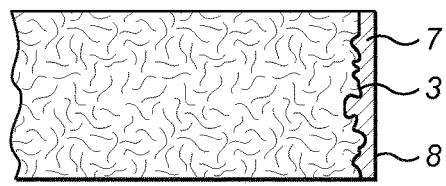

FIG. 2b demonstrates how a polymeric foam layer (7) applied to the minor face (3) as a foam composition that is subsequently cured may compensate for these defects. The polymeric foam layer (7) may possess a uniform, flat surface (8), whilst closing the defects of the cut edge of the MMVF panel at the minor face (3).

Figure 2C:
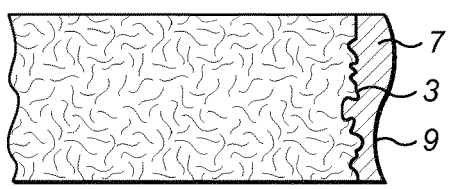

A further advantage of the polymeric foam layer (7) is that detailed edge shapes may be produced. An example of a MMVF panel edge with shaped polymeric foam layer (9) is shown in FIG. 2c.

Figure 3:
FIG. 3 shows a panel with a glass fibre front facing.
Figure 4:
FIG. 4 shows panel similar to that of FIG. 3, additionally with an overhang of the facing.

The method of the invention may be optimised to minimise the amount of material wastage. Foam compositions may have a viscosity that is insufficiently high to prevent dripping prior to expansion and curing, but the disadvantages in this case can be mitigated FIG. 3 shows a schematic of a MMVF panel comprising a glass fibre facing (10) at the first major face (12). The second major face (13) is not provided with such a facing because in normal use the second major face (13) of such MMVF panels is not visible. Similarly, the minor face (3) is not provided with a glass fibre facing.

The glass fibre facing (10) may be provided such that there is an overhang (11) of glass fibre material extending past the end of the front major face (12). The overhang can prevent the applied foam composition from spreading to the front major face. This is beneficial, since any foam that becomes inadvertently present at the front major face must be removed.

Figure 5:
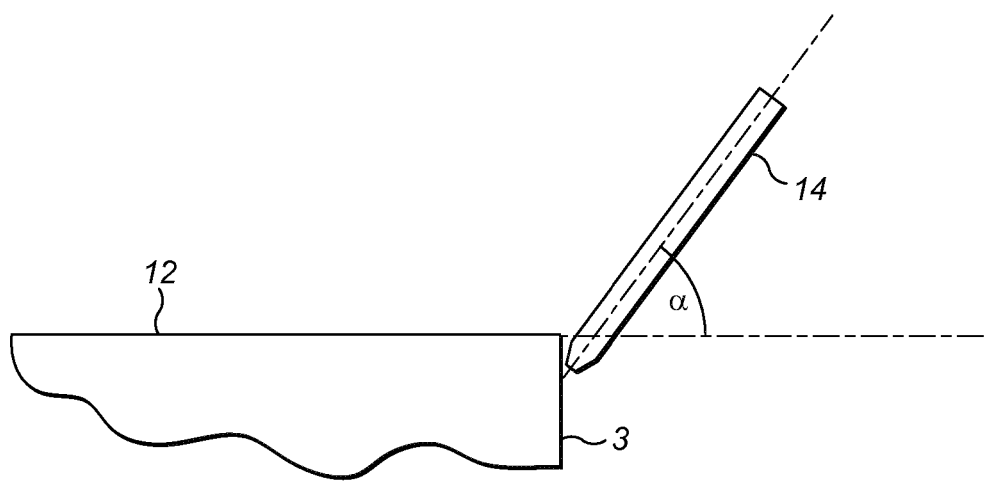
FIG. 5 shows the application of the foam composition with the use of a nozzle.

An example of the method of application of the foam composition onto the minor face (3) is shown in FIG. 5. Foam composition is provided via a nozzle (14) and extruded onto the minor face (3) adjacent to the edge shared with the front major face (12).

The angle (α) between the nozzle (14) and the plane of the front major face (12) may depend on whether or not an overhang (11) of glass fibre facing (10) is provided. Where no overhang (11) is provided, an angle (α) of from 60° to 70° may be suitable. Where an overhang (11) is provided, a shallower angle (α) of from 20° to 30° may be suitable. When it is important to ensure full coverage of the area of the minor face immediately beneath the overhanging facing (10), the nozzle can be angled upwardly, so that the angle (α) is in the range 0° to −30°, preferably −10° to −20°. Namely, the angle (α) is measured below the horizontal.

FIGS. 6A-D show schematic representations of a cross-section of a panel (1) at various stages of application of a polymeric foam layer (7) on part of a minor face (3) of the panel (1). The panel (1) is provided with a fleece facing (10) bonded onto and covering a major face (2), for example a glass fibre fleece facing.

Figure 6A:
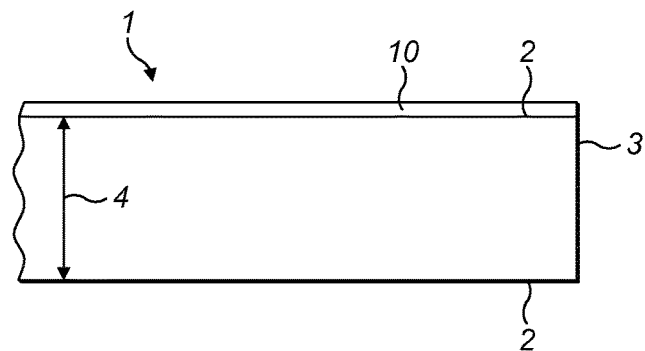
FIG. 6 shows a panel edge through stages of foam application.

FIG. 6A shows the panel (1) with fleece facing (10) prior to any surface alterations on the minor face (3).

Figure 6B:
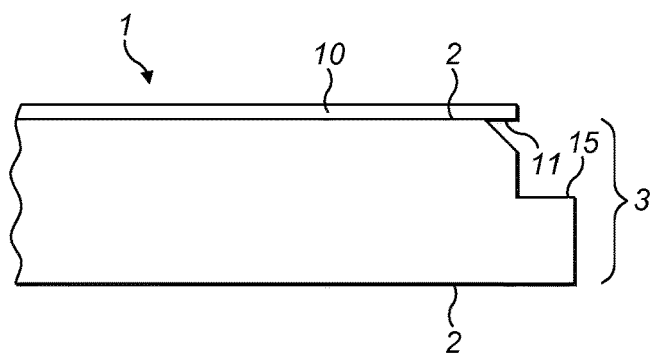

In FIG. 6B, a minor face (3) of the panel (1) has been milled or ground with a shape that includes a terrace (15). The fleece facing (10) is left with an overhang (11).

Figure 6C:
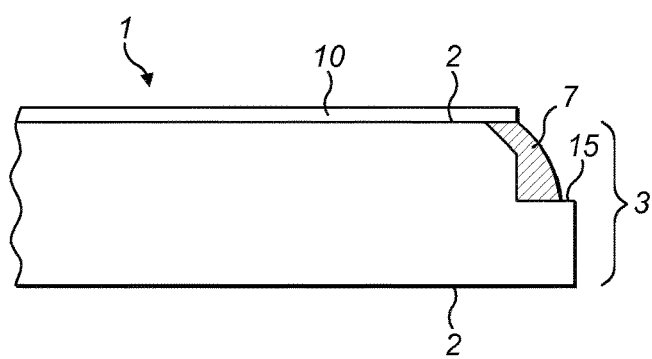
Figure 6D:
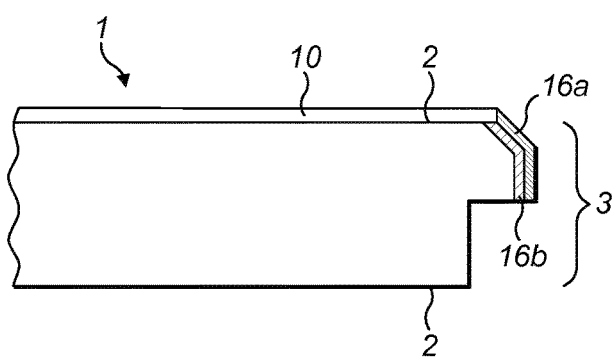

A foamable composition is applied to minor face (3) between the fleece overhang (11) and the terrace (15), as shown in FIG. 6C. The foamable composition may cure into a foam (7). The overhang (11) prevents foam seeping onto the major face (2) and the terrace (15) prevents downwards dripping of the foamable composition prior to curing. The fleece facing (10) is facing upwards during application of the foamable composition in this example.

After curing, the foam (7) may be milled or ground to form a desired edge profile. During application and curing, it is possible that some or all of the foamable composition may seep into the fabric of the panel (1), for example into the MMVF if used for the panel (1). Thus, there may be an internal portion (16b) of the foam and/or an external portion (16a) of the foam.

The terrace (15) may be removed by milling, grinding or another suitable mechanical means if it is not desired to be present in the final edge profile of the panel (1). This may be done in the same step as removing the excess foam, or in a separate step.

Figure 6E:
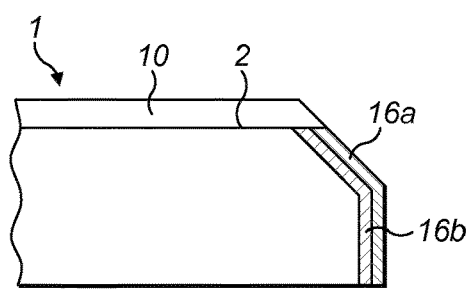

FIG. 6E shows a close-up view of internal (16b) and external (16a) portions of the foam layer in the case where the foam partially seeps into the panel.

The invention claimed is:

1. A ceiling panel comprising a man-made vitreous fibre (MMVF) panel or a wood wool cement panel, wherein said MMVF panel or wood wool cement panel has a first major face opposed to a second major face and at least one minor face extending between the major faces; said ceiling panel comprising a layer of milled polymeric foam applied to a minor face of said MMVF panel or wood wool cement panel; wherein the polymeric foam is only provided on one or more of the minor faces.

2. The ceiling panel of claim 1 wherein the milled polymeric foam is a polyurethane foam, a silicone foam or an epoxy foam.

3. The ceiling panel according to claim 1, wherein the milled polymeric foam is a chemically-curing foam.

4. The ceiling panel of claim 1 wherein the layer of milled polymeric foam covers not more than half the width of the minor face.

5. The ceiling panel of claim 1 wherein the panel has thickness of 10-100 mm, a width of 300-1200 mm and a length of 600-1200 mm.

6. The ceiling panel of claim 1, wherein the panel comprises bonded MMVF.

7. The ceiling panel of claim 6 wherein the panel has a density in the range of 70 to 150 kg/m³.

8. The ceiling panel of claim 1 comprising a glass fibre facing on at least one of the two major faces.

9. The ceiling panel of claim 2 wherein the milled polymeric foam is a polyurethane foam.

10. The ceiling panel of claim 4 wherein the layer of milled polymeric foam covers not more than one quarter of the width of the minor face.

11. The ceiling panel of claim 6 wherein the panel has a density in the range of 90 to 120 kg/m³.

12. The ceiling panel of claim 1 wherein the layer of milled polymeric foam has a three-dimensional edge profile.

13. The ceiling panel of claim 1 wherein the polymeric foam does not comprise a filler.

14. The ceiling panel of claim 1 wherein at least one of the two major faces comprises a MMVF facing.

* * * * *